(12) United States Patent
Marutani et al.

(10) Patent No.: US 12,332,508 B2
(45) Date of Patent: Jun. 17, 2025

(54) LIGHT SHIELDING MEMBER

(71) Applicant: NITTA Corporation, Osaka (JP)

(72) Inventors: Kosuke Marutani, Yamatokohriyama (JP); Takumi Kato, Yamatokohriyama (JP); Takashi Megumi, Yamatokohriyama (JP); Satoshi Yamaguchi, Yamatokohriyama (JP); Koji Yamashita, Yamatokohriyama (JP)

(73) Assignee: NITTA Corporation, Osaka (JP)

( * ) Notice: Subject to any disclaimer, the term of this patent is extended or adjusted under 35 U.S.C. 154(b) by 502 days.

(21) Appl. No.: 17/765,701

(22) PCT Filed: Sep. 29, 2020

(86) PCT No.: PCT/JP2020/036863
§ 371 (c)(1),
(2) Date: Mar. 31, 2022

(87) PCT Pub. No.: WO2021/070673
PCT Pub. Date: Apr. 15, 2021

(65) Prior Publication Data
US 2022/0404646 A1    Dec. 22, 2022

(30) Foreign Application Priority Data
Oct. 9, 2019   (JP) .................. 2019-185854

(51) Int. Cl.
*G02F 1/01* (2006.01)
*C08F 220/18* (2006.01)
(Continued)

(52) U.S. Cl.
CPC ........ *G02F 1/009* (2013.01); *C08F 220/1818* (2020.02); *G02F 1/0311* (2013.01); *C08F 2500/34* (2021.01); *G02F 1/132* (2013.01)

(58) Field of Classification Search
CPC .............................. G02F 1/0147; G02B 26/02
See application file for complete search history.

(56) References Cited

U.S. PATENT DOCUMENTS

2003/0129247 A1* 7/2003 Ju ............................ A61K 8/11
424/490
2009/0015902 A1* 1/2009 Powers ................ G02F 1/0147
349/163
(Continued)

FOREIGN PATENT DOCUMENTS

JP           58-10717 A      1/1983
JP         2011-522277 A     7/2011
(Continued)

*Primary Examiner* — Joseph P Martinez
(74) *Attorney, Agent, or Firm* — Volpe Koenig

(57) ABSTRACT

A light shielding member of the present invention includes a first polarizing plate, a second polarizing plate facing the first polarizing plate, and a thermosensitive sheet interposed between the first polarizing plate and the second polarizing plate, in which the first polarizing plate and the second polarizing plate are positioned so that their respective transmission axes are different from each other, and the thermosensitive sheet contains a side chain crystal polymer that crystallizes at a temperature lower than the melting point and exhibits fluidity at a temperature of the melting point or higher. The light shielding member may transmit light at a temperature lower than the melting point and may not transmit light at a temperature of the melting point or higher, when light travels from one of the first polarizing plate and the second polarizing plate toward the other.

5 Claims, 1 Drawing Sheet

(51) Int. Cl.
    *G02F 1/00*     (2006.01)
    *G02F 1/03*     (2006.01)
    *G02F 1/13*     (2006.01)

(56) References Cited

U.S. PATENT DOCUMENTS

2013/0122288 A1    5/2013   Miki et al.
2015/0070746 A1    3/2015   Powers et al.

FOREIGN PATENT DOCUMENTS

| | | |
|---|---|---|
| JP | 2013-173912 A | 9/2013 |
| JP | 2015-174997 A | 10/2015 |
| WO | WO 2009/086274 A1 | 7/2009 |

\* cited by examiner

LIGHT SHIELDING MEMBER

TECHNICAL FIELD

The present invention relates to a light shielding member.

BACKGROUND ART

A light shielding member that electrically controls the transmission and non-transmission of light is known (see, for example, Patent Document 1).

PRIOR ART DOCUMENT

Patent Document

Patent Document 1: Japanese Unexamined Patent Publication No. S58-10717

SUMMARY OF THE INVENTION

Problem to be Solved by the Invention

The object of the present invention is to provide a light shielding member in which the transmission and non-transmission of light can be controlled by temperature.

Means for Solving the Problem

The light shielding member of the present invention includes a first polarizing plate, a second polarizing plate facing the first polarizing plate, and a thermosensitive sheet interposed between the first polarizing plate and the second polarizing plate, wherein the first polarizing plate and the second polarizing plate are positioned so that their respective transmission axes are different from each other, and the thermosensitive sheet contains a side chain crystal polymer which is crystallized at a temperature lower than the melting point, while exhibiting fluidity at a temperature of the melting point or higher.

Effects of the Invention

According to the present invention, it has the effect that the transmission and non-transmission of light can be controlled by temperature.

EMBODIMENTS FOR CARRYING OUT THE INVENTION

Hereinafter, the light shielding member according to one embodiment of the present invention is described in detail with reference to FIGS. 1 and 2.

Figure 1:
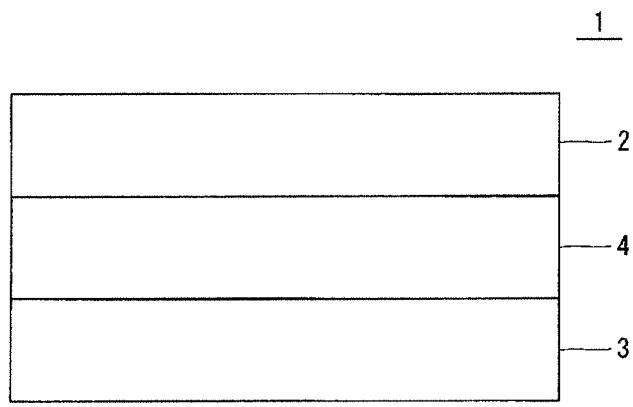
FIG. 1 is a side view illustrating a light shielding member according to one embodiment of the present invention.
Figure 2:
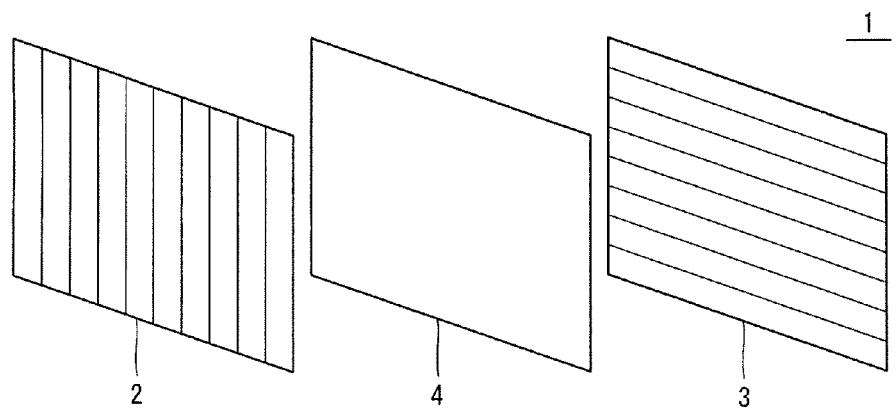
FIG. 2 is a disassembled perspective view of the light shielding member illustrated in FIG. 1.

As illustrated in FIGS. 1 and 2, a light shielding member 1 of the present embodiment includes a first polarizing plate 2, a second polarizing plate 3 facing the first polarizing plate 2, and a thermosensitive sheet 4 interposed between the first polarizing plate 2 and the second polarizing plate 3. The light shielding member 1 of the present embodiment is a laminated body in which the first polarizing plate 2 is laminated on one side of the thermosensitive sheet 4 and the second polarizing plate 3 is laminated on the other side of the thermosensitive sheet 4.

The first polarizing plate 2 and the second polarizing plate 3 are positioned so that their respective transmission axes are different from each other. The thermosensitive sheet 4 contains the side chain crystal polymer which is crystallized at a temperature lower than the melting point while exhibiting fluidity at a temperature of the melting point or higher.

According to the composition described above, it is possible to obtain the effect that the transmission and non-transmission of light can be controlled by temperature. To be more specific, the side chain crystal polymer described above is a polymer having a melting point. The melting point is a temperature at which, due to some equilibrium process, certain parts of the polymer which is initially aligned into an ordered arrangement become a disordered state, and is a value measured by using a differential scanning calorimeter (DSC) under a measurement condition of 10° C./min. The side chain crystal polymer is crystallized at a temperature lower than the melting point described above and exhibits fluidity through a phase transition at a temperature of the melting point or higher. In other words, the side chain crystal polymer has thermosensitivity that reversibly generates a crystal state and a fluid state (amorphous state) in response to temperature changes. Containing such a side chain crystal polymer, the thermosensitive sheet 4 has thermosensitivity derived from the side chain crystal polymer.

As described above, the first polarizing plate 2 and the second polarizing plate 3 are positioned so that their respective transmission axes are different from each other. Therefore, under the condition in the absence of the thermosensitive sheet 4, if light travels through the first polarizing plate 2 and the second polarizing plate 3 in this order, the light transmitted through the first polarizing plate 2 is not transmitted through the second polarizing plate 3. This point also applies to the case where the light travels in the order of the second polarizing plate 3 and the first polarizing plate 2.

When the side chain crystal polymer is in a crystal state, light is scattered in the thermosensitive sheet 4. Therefore, when the temperature of the light shielding member 1 is set to a temperature lower than the melting point, the light transmitted through the first polarizing plate 2 is scattered when it is transmitted through the thermosensitive sheet 4, and as a result, the light is transmitted through the second polarizing plate 3. In addition, when the side chain crystal polymer is in a fluid state, light is not scattered inside the thermosensitive sheet 4. Thus, when the temperature of the light shielding member 1 is set to a temperature of the melting point or higher, the light transmitted through the first polarizing plate 2 is not scattered when it is transmitted through the thermosensitive sheet 4 and accordingly is not transmitted through the second polarizing plate 3.

In this way, the light shielding member 1 can control the light shielding function (light and dark change) depending on the temperature, since the light shielding member 1 utilizes the change in optical characteristics of the side chain crystal polymer in addition to the thermosensitivity of the side chain crystal polymer. That is, the light shielding member 1 transmits light at a temperature lower than the melting point and does not transmit light at a temperature of the melting point or higher, when light travels from one of the first polarizing plate 2 and the second polarizing plate 3 toward the other. For example, the light shielding member 1 is transparent at a temperature lower than the melting point, and black at a temperature of the melting point or higher. In addition, the light shielding member 1 can repeatedly transmit and non-transmit light due to the fact that the side chain crystal polymer reversibly generates a crystal state and a fluid state in response to temperature changes. It is sufficient that the transmission and non-transmission of light in the light shielding member 1 (light shielding function) can be confirmed visually.

The thickness of the first polarizing plate 2 is, for example, 200-1000 µm. The thickness of the second polarizing plate 3 is, for example, 200-1000 µm. The respective thicknesses of the first polarizing plate 2 and the second polarizing plate 3 may be the same or may be different. A commercially available product can be used for the first polarizing plate 2 and the second polarizing plate 3.

The transmission axes of the first polarizing plate 2 and the second polarizing plate 3, respectively, may be different from each other at an angle where the light transmitted through one does not transmit through the other, when the light travels from one of the first polarizing plate 2 and the second polarizing plate 3 toward the other in the absence of the thermosensitive sheet 4. Such an angle is, for example, 80 to 100°. FIG. 2 shows the state in which the transmission axes of the first polarizing plate 2 and the second polarizing plate 3, respectively, are 90° different from each other. That is, the first polarizing plate 2 and the second polarizing plate 3 illustrated in FIG. 2 are positioned so that their respective transmission axes are 90° different from each other.

The melting point of the side chain crystal polymer is preferably higher than 23° C., more preferably higher than 23° C. and 70° C. or lower, and further more preferably 35 to 70° C. If the melting point is higher than 23° C., the light shielding member 1 transmits light at room temperature. The melting point can be adjusted, for example, by changing the composition of a monomer component that constitutes the side chain crystal polymer.

The side chain crystal polymer includes (meth)acrylate having a straight-chain alkyl group with 16 or more carbon atoms as a monomer component. For the (meth)acrylate having a straight-chain alkyl group with 16 or more carbon atoms, the straight-chain alkyl group with 16 or more carbon atoms functions as a side chain crystal part in the side chain crystal polymer. Specifically, the side chain crystal polymer is a comb-shaped polymer having a straight-chain alkyl group with 16 or more carbon atoms in the side-chain, and this side-chain is crystallized when it is aligned into an ordered arrangement by intermolecular forces or the like. The (meth)acrylate described above refers to acrylate or methacrylate.

Examples of the (meth)acrylate having a straight-chain alkyl group with 16 or more carbon atoms include (meth) acrylate having a linear alkyl group with 16-22 carbon atoms, such as cetyl (meth)acrylate, stearyl (meth)acrylate, eicosyl (meth)acrylate, behenyl (meth)acrylate, or the like. Only one type of the exemplified (meth)acrylate may be used, or two or more of them may be used in combination. The (meth)acrylate having a straight-chain alkyl group with 16 or more carbon atoms is included preferably at a ratio of 10-99% by weight and more preferably at a ratio of 15-99% by weight in the monomer component which constitutes the side chain crystal polymer.

The monomer component which constitutes the side chain crystal polymer may include other monomer which can be copolymerized with (meth)acrylate having a straight-chain alkyl group with 16 or more carbon atoms. Other monomer may include, for example, (meth) acrylate having an alkyl group with 1-6 carbon atoms, polar monomer, or the like.

Examples of (meth) acrylate having an alkyl group with 1-6 carbon atoms include methyl (meth) acrylate, ethyl (meth) acrylate, butyl (meth) acrylate, hexyl (meth) acrylate, or the like. Only one type of the exemplified (meth)acrylate may be used, or two or more may be used in combination. The (meth)acrylate having an alkyl group with 1-6 carbon atoms is included in preferably at a ratio of 80% by weight or less and more preferably at a ratio of 0-80% by weight the monomer component which constitutes the side chain crystal polymer.

The polar monomer includes, for example, an ethylenically unsaturated monomer having a carboxyl group, such as acrylic acid, methacrylic acid, crotonic acid, itaconic acid, maleic acid, and fumaric acid; an ethylenically unsaturated monomer having a hydroxyl group, such as 2-hydroxyethyl (meth)acrylate, 2-hydroxypropyl (meth)acrylate, and 2-hydroxyhexyl (meth)acrylate. Only one type of the exemplified polar monomer may be used, or two or more may be used in combination. The polar monomer is included preferably at a ratio of 10% by weight or less and more preferably at a ratio of 1-10% by weight in the monomer component which constitutes the side chain crystal polymer.

The preferred composition of the side chain crystal polymer is 15-90% by weight of (meth)acrylate having a straight-chain alkyl group with 16 or more carbon atoms, 5-75% by weight of (meth)acrylate having an alkyl group with 1-6 carbon atoms, and 5-10% by weight of a polar monomer. Another preferred composition of the side chain crystal polymer is 90-99% by weight of (meth) acrylate having a straight-chain alkyl group with 16 or more carbon atoms and 1-10% by weight of a polar monomer.

The polymerization method of the monomer component includes, for example, solution polymerization method, bulk polymerization method, suspension polymerization method, and emulsion polymerization method. If the solution polymerization method is used, the monomer component and solvent are mixed, polymerization initiator, chain transfer agent, or the like is added as necessary, and reaction is performed at 40-90° C. for approximately 2-10 hours while stirring.

The weight average molecular weight of the side chain crystal polymer is preferably 100000 or more, more preferably 200000-900000, and further more preferably 250000-700000. The weight average molecular weight is measured by gel permeation chromatography (GPC), and is a polystyrene converted value of the resulting measured value.

The thermosensitive sheet 4 may contain the side chain crystal polymer in a ratio that causes it to exhibit thermosensitivity derived from the side chain crystal polymer. For example, the thermosensitive sheet 4 may contain the side chain crystal polymer as its main component. The main component means the component which is contained in the most amount by weight in the thermosensitive sheet 4. The content of the side chain crystal polymer may be 80% by weight or more. The upper limit value of the content of side chain crystal polymer may be 100% by weight or less.

In addition to the side chain crystal polymer, the thermosensitive sheet 4 may also contain an additive or the like. The additive includes, for example, a crosslinking agent. The crosslinking agent includes, for example, a metal chelate compound, aziridine compound, isocyanate compound, and epoxy compound. The content of the crosslinking agent is preferably 0.1-10 parts by weight to 100 parts by weight of the side chain crystal polymer. The crosslinking conditions are a heating temperature of approximately 90-120° C. and a heating time of approximately 1 minute to 20 minutes.

The thickness of the thermosensitive sheet 4 is, for example, 40-1500 µm. The concept of the thermosensitive sheet 4 is not limited to a sheet form, but also includes a film form or a plate form, as long as the effect of the present embodiment is not damaged.

The thermosensitive sheet 4 may be in direct contact with the first polarizing plate 2 and the second polarizing plate 3. In this case, the light transmitted through the first polarizing plate 2 or the second polarizing plate 3 is incident on the thermosensitive sheet 4 without loss, and therefore, the light shielding member 1 exhibits an excellent light shielding function.

Since the thermosensitive sheet 4 fixes the first polarizing plate 2 and the second polarizing plate 3 without any adhesive layer, it is possible to directly contact the first polarizing plate 2 and the second polarizing plate 3. Specifically, when the temperature of the thermosensitive sheet 4 is set to a temperature of the melting point or higher, the side chain crystal polymer shows fluidity, and, thus the thermosensitive sheet 4 can be attached to the first polarizing plate 2 and the second polarizing plate 3. When the side chain crystal polymer exhibits fluidity, the thermosensitive sheet 4 follows a fine concave-convex shape that exists on the surface of the first polarizing plate 2 and the second polarizing plate 3. When the thermosensitive sheet 4 in this state is cooled to a temperature lower than the melting point, the so-called anchoring effect is generated by crystallization of the side chain crystal polymer, and as a result, the first polarizing plate 2 and the second polarizing plate 3 can be fixed with the thermosensitive sheet 4. If necessary, other members may be interposed between the thermosensitive sheet 4 and the first polarizing plate 2. Likewise, other members may be interposed between the thermosensitive sheet 4 and the second polarizing plate 3.

The form of the light shielding member 1 is not particularly limited. The light shielding member 1 may be in the form of a film, sheet, plate, or the like, for example.

The light shielding member 1 can be suitably used in places where light shielding functions are required and temperature changes are likely to occur. The light shielding member 1 may be for a window glass, partition, automotive glass, or the like, for example. The applications of the light shielding member 1 are not limited to those shown in the examples.

Hereafter, the present invention is described in detail with synthetic examples and Examples, but the present invention is not limited only to the following Synthetic Examples and Examples.

Synthetic Examples 1 to 8: Side Chain Crystal Polymer

First, the monomers shown in Table 1 were added to a reaction vessel in the proportions shown in Table 1. The monomers shown in Table 1 are as follows.
C22A: behenyl acrylate
C1A: methyl acrylate
C4A: butyl acrylate
AA: acrylic acid Next, a mixed solvent of ethyl acetate:heptane=70:30 (weight ratio) was added to the reaction vessel so as to obtain a solid concentration of 30% by weight, and a mixed solution was obtained. The resulting mixed solution was stirred at 55° C. for 4 hours to copolymerize each monomer and obtain the side chain crystal polymer.

The weight average molecular weights and melting points of the obtained side chain crystal polymers are shown in Table 1. The weight average molecular weight is a polystyrene-converted value of the measured value obtained by GPC. The melting point is a value measured by using DSC under the measurement condition of 10° C./min.

Comparative Synthetic Example 1

The polymer was obtained by copolymerizing each monomer in a similar manner to Synthetic Examples 1 to 8, except that the monomers shown in Table 1 were added to the reaction vessel in the proportions shown in Table 1. The weight average molecular weight of the obtained polymer was measured in a similar manner to Synthetic Examples 1 to 8. The result is shown in Table 1. The polymer in Comparative Synthetic Example 1 is a polymer that has adhesiveness and has no melting point.

TABLE 1

|  | Monomer Component[1] (% by weight) | | | | Weight Average Molecular Weight | Melting Point (° C.) |
|---|---|---|---|---|---|---|
|  | C22A | C1A | C4A | AA |  |  |
| Synthetic Example 1 | 45 | 0 | 50 | 5 | 650000 | 40 |
| Synthetic Example 2 | 20 | 75 | 0 | 5 | 450000 | 37 |
| Synthetic Example 3 | 30 | 65 | 0 | 5 | 510000 | 47 |
| Synthetic Example 4 | 45 | 50 | 0 | 5 | 560000 | 55 |
| Synthetic Example 5 | 55 | 40 | 0 | 5 | 650000 | 57 |
| Synthetic Example 6 | 75 | 20 | 0 | 5 | 550000 | 63 |
| Synthetic Example 7 | 90 | 5 | 0 | 5 | 320000 | 66 |
| Synthetic Example 8 | 95 | 0 | 0 | 5 | 300000 | 67 |
| Comparative Synthetic Example 1 | 0 | 95 | 0 | 5 | 350000 | — |

[1]C22A: Behenyl Acrylate, C1A: Methyl Acrylate, C4A: Butyl Acrylate, AA Acrylic Acid Example 1

<Preparation of Test Pieces>

First, the mixture was obtained by mixing in a ratio of 1 part by weight of the crosslinking agent to 100 parts by weight of the side chain crystal polymer that was obtained in Synthetic Example 1. The crosslinking agent used is as follows.

Crosslinking agent: aluminum tris-acetylacetonate manufactured by Kawaken Fine Chemicals Co., Ltd., which is a metal chelate compound.

Next, the resulting mixture was adjusted by ethyl acetate so as to obtain a solid concentration of 23% by weight, and the coating solution was obtained. The resulting coating solution was then applied to a release film placed on a hot plate heated to 70° C., and the crosslinking reaction was carried out under the condition of 110° C.×3 minutes to obtain a thermosensitive sheet with a thickness of 160 μm. The release film used was a polyethylene terephthalate film with a thickness of 50 μm that was coated with silicone on the surface.

The resulting thermosensitive sheet was then removed from the release film and interposed between the first polarizing plate and the second polarizing plate to obtain a laminated body. At this time, the first polarizing plate and the second polarizing plate were disposed so that their respective transmission axes were 90° different from each other.

The same polarizing plate was used for the first polarizing plate and the second polarizing plate. The polarizing plate used is as follows.

Polarizing plate: polarizing plate with a thickness of 250 μm manufactured by Artec Co., Ltd.

Next, the resulting laminate body was heated to a temperature of the melting point (70° C.) or higher using a dryer, and the thermosensitive sheet was attached to the first polarizing plate and the second polarizing plate. The laminate body was then cooled to room temperature (23° C.), and the first polarizing plate and the second polarizing plate were fixed with the thermosensitive sheet to obtain the test pieces.

<Evaluation>

A test piece obtained in Example 1 was evaluated for the light shielding function. Specifically, the test piece was first visually observed at room temperature. As a result, the test piece was transparent. Next, the test piece was heated to a temperature of the melting point (70° C.) or higher using a dryer and visually observed. As a result, the test piece turned black. The test piece was then cooled to room temperature again and visually observed. As a result, the test piece changed to transparent. These results clearly show that Example 1 transmits light at a temperature lower than the melting point and does not transmit light at a temperature of the melting point or higher. It is also apparent that Example 1 repeats the transmission and non-transmission of light.

Comparative Example 1

The coating solution was obtained in a similar manner to Example 1, except that the polymer obtained in Comparative Synthetic Example 1 was used, and the resulting coating solution was used to obtain an adhesive sheet with a thickness of 160 μm. The resulting adhesive sheet was then interposed between the first polarizing plate and the second polarizing plate, and the first polarizing plate and the second polarizing plate were fixed with the adhesive sheet to obtain the test pieces. The same first polarizing plate and second polarizing plate as in Example 1 were used. The first polarizing plate and the second polarizing plate were disposed so that their respective transmission axes were 90° different from each other. The preparation of the test pieces was done at room temperature.

The light shielding function of the test piece obtained in Comparative Example 1 was evaluated in a similar manner to Example 1. As a result, the test piece was black at both room temperature and 70° C.

DESCRIPTION OF THE REFERENCE NUMERAL 1 light shielding member
2 first polarizing plate
3 second polarizing plate
4 thermosensitive sheet

The invention claimed is:

1. A light shielding member comprising
a first polarizing plate,
a second polarizing plate facing the first polarizing plate, and
a thermosensitive sheet interposed between the first polarizing plate and the second polarizing plate, wherein
the first polarizing plate and the second polarizing plate are positioned so that their respective transmission axes are different from each other,
the thermosensitive sheet comprises a side chain crystal polymer that crystallizes at a temperature lower than the melting point and exhibits fluidity at a temperature of the melting point or higher,
the side chain crystal polymer comprises (meth) acrylate having a straight-chain alkyl group with 16 or more carbon atoms as a monomer component, and
a polar monomer included in the monomer component at a ratio of 1-10% by weight which constitutes the side chain crystal polymer.

2. The light shielding member according to claim 1, wherein light is transmitted at a temperature lower than the melting point and not transmitted at a temperature of the melting point or higher, when light travels from one of the first polarizing plate and the second polarizing plate toward the other.

3. The light shielding member according to claim 1, wherein the melting point is higher than 23° C.

4. The light shielding member according to claim 1, wherein the thermosensitive sheet is in direct contact with the first polarizing plate and the second polarizing plate.

5. The light shielding member according to claim 1, wherein the polar monomer is at least one of:
an ethylenically unsaturated monomer having a carboxyl group, or
an ethylenically unsaturated monomer having a hydroxyl group.

* * * * *